July 16, 1968   J. HULSEBOS ET AL   3,392,693
METHOD OF AND MEANS FOR REDUCING DRAG
Filed Nov. 2, 1966
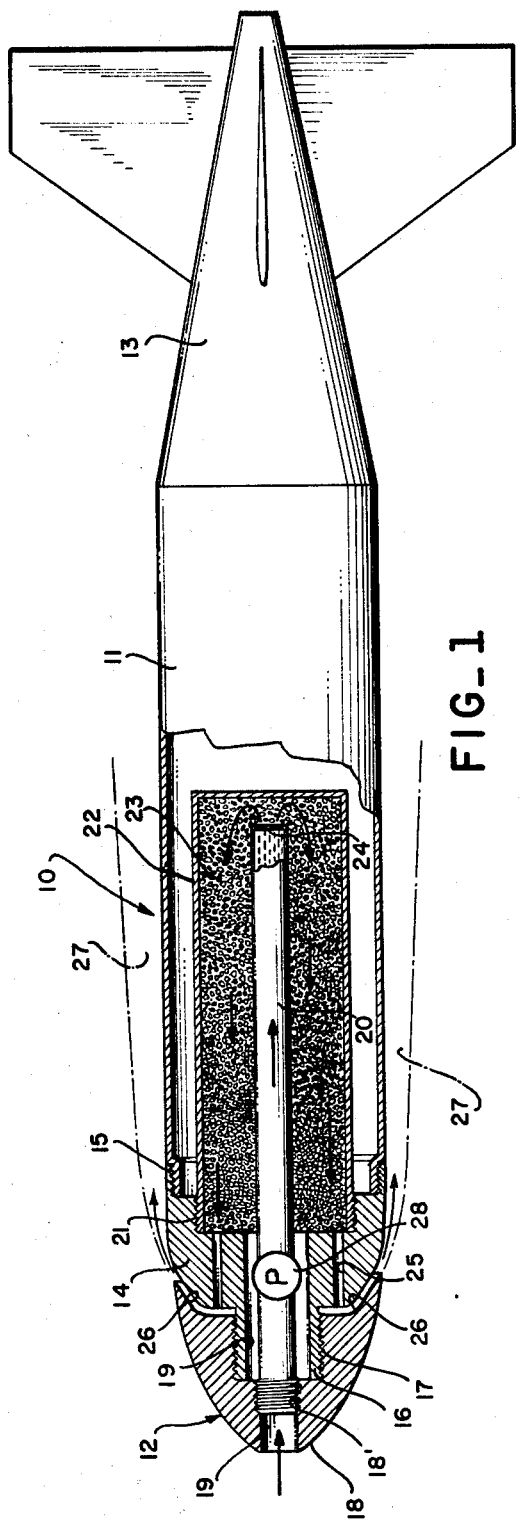
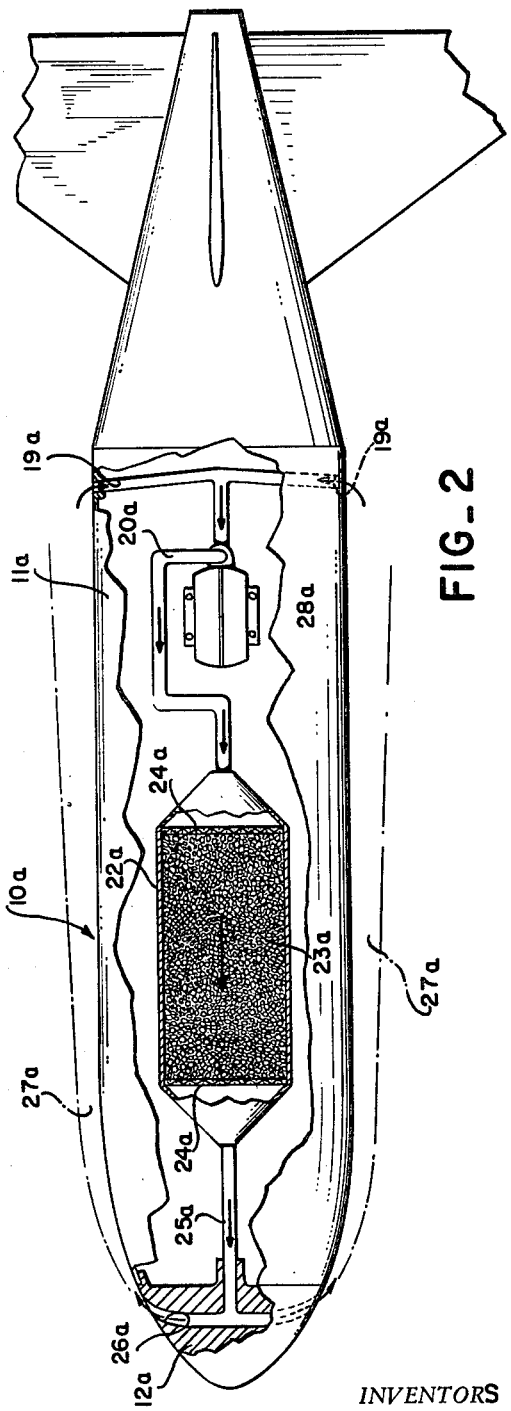
INVENTORS
JAN HULSEBOS
WILLI F. JACOBS
BY
*George C. Sullivan*
Agent

United States Patent Office 3,392,693
Patented July 16, 1968

3,392,693
METHOD OF AND MEANS FOR REDUCING DRAG
Jan Hulsebos and Willi F. Jacobs, Atlanta, Ga., assignors to Lockheed Aircraft Corporation, Burbank, Calif.
Filed Nov. 2, 1966, Ser. No. 591,634
4 Claims. (Cl. 114—20)

ABSTRACT OF THE DISCLOSURE

A scheme is provided for friction reduction in water by means of very efficient ejections of macromolecular solutions at the water/solid interface. This scheme further allows for the application of boundary layer suction aft of the injection region to recover part of the solution and to aid in retarding transition from laminar to turbulent flow. The suction is applied by a pump which recirculates a portion of this diluted macromolecular solution after being concentrated by passing through a system where more friction-reducing agent is added.

---

This invention relates to drag-reducing schemes, i.e., friction-reducing techniques with respect to objects moving through a fluid medium, and more particularly to a method of and means for applying a friction-reducing material, such as water-soluble macro-molecular materials, to the exterior surfaces of objects moving through water.

Water-soluble macro-molecular materials, such as the polyethylene oxides, are known to cause friction reduction when they are introduced in water. These have been used heretofore by applying them to the outside surfaces of objects moving through the water to reduce the friction and thereby increase speed or reduce power consumption to give greater operating range to the object or vehicle.

The problem has been and is in the method and means of applying such materials so as to give them a comparatively efficient and lengthy service life. Since operation of the surface through the water quickly removes the material, most users have become reconciled to emergency use only or as a merely short term drag reducer for selected times during operation of the object. This avoids problems otherwise incidental to constant or long-term use involving a large on-board supply of expendable materials, robbing the object or body of valuable storage space, adding to its weight and operating costs, etc.

The present invention is therefore directed primarily to an efficient method and means for applying a friction-reducing agent at the interface of an object and surrounding fluid in which the object is adapted to move. In this way, it is intended to satisfy long-term uses in an economical way and at the same time enhance the performance and extend the operating range of such objects and vehicles. Thus, prior schemes predicated in essence on soluble coatings that are exposed to the ambient water and allowed to dissolve therein are purposely avoided in favor of a new approach to the problem.

In essence, the method herein contemplated consists in taking into the object an ambient fluid or water and contacting it with a selected friction-reducing material and ejecting the solution from the object adjacent the forward end thereof, whereby is passes along virtually the entire length of the object in the boundary layer region when the object is moving through the water. The water intake may be effected in or near the stagnation region, i.e., the region of maximum pressure of the water on the object, in which case the velocity of the object is employed as a driving force. However, the invention also contemplates fluid intake from the boundary layer near the aft end of the object to thereby stabilize the boundary layer and at the same time recover a portion of the friction-reducing material for recirculation through the system. In either case, force pressure means in the form of a pump or the like, may be employed to assure the proper flow of the fluid and/or fluid/agent solution.

In carrying out the above method, one or more inlet openings is provided in the object selectively located relative to the stagnation and/or boundary layer regions. Internally, the object is provided with conduits interconnecting such openings with a chamber filled with friction-reducing material preferably in pelletized form and also interconnecting such chamber with one or more ejecting outlets adjacent the forward end of the object. Thus, ambient fluid taken in at each opening is made to pass through the friction-reducing material and a dilute solution of the material and the fluid leaves the chamber for delivery into the boundary layer.

When the inlet opening or openings are located in the stagnation region, the velocity of the object passing through the water may serve to force the fluid through the chamber and outlet openings, or pump means may be provided to facilitate this. Where the inlet opening or openings are located adjacent the aft end of the object, however, a pump or the like is provided to apply a negative pressure or suction at such inlet openings whereby boundary layer fluid is drawn into the chamber and ultimately discharged, after contact with the friction-reducing agent, out through the ejecting outlet or outlets. In this case, a portion of the friction-reducing agent in the boundary layer is recovered by each inlet opening and recirculated through the system.

With the above and other objects in view as will be apparent, this invention consists in the several procedural steps as well as the construction, combination and arrangement of parts all as hereinafter more fully described, claimed and illustrated in the accompanying drawings wherein:

FIGURE 1 is a longitudinal view partly in section of an object, such as for example a torpedo, adapted to receive and mount internally ejecting means constructed in accordance with the teachings hereof to show a preferred embodiment wherein the intake opening for the ambient fluid is located at the stagnation point and connected by appropriate conduits for circulation of the fluid through a chamber filled with tightly-packed pellets of friction-reducing material and ultimate ejection adjacent the nose of the torpedo; and FIGURE 2 is a similar view showing a somewhat different embodiment of the invention wherein ambient fluid inlet openings are located adjacent the aft end of the object or torpedo and a pump to draw or suck in boundary layer fluid for delivery to the chamber of friction-reducing agent and the resulting solution discharged through ejection openings adjacent the nose of the torpedo.

Referring more particularly to the drawings, 10 designates a torpedo formed by a main body portion 11, a nose section 12, and a tail section 13, including a conventional fin arrangement. Referring to the embodiment of FIGURE 1, the nose section 12 includes an enclosing cap 14 adapted to threadably connect as at 15 to the forward end of the main body 11. At its center, the cap 14 terminates in a forward-extending neck 16 adapted to receive and connect as at 17 a nose cone 18. The cap 14 and nose cone 18 are each pierced centrally by an axial bore 19 adapted to align one with the other when the cap and cone are threadably connected. The end of the bore 19 associated with nose cone 18 adjacent the neck 16 is internally threaded as at 18' to receive and mount therein a tube or pipe 20 constituting a conduit to deliver water entering the bore 19 in the nose cone 18 therethrough and out the aft end.

Adjacent its aft end, the cap 14 is internally threaded as at 21 being adapted to receive and mount therein a canister 22, which thereby overlies and closes the pipe 20. When thus installed therein, the pipe 20 terminates short of the aft end wall of the canister 22 so as not to obstruct fluid flow therethrough.

The canister 22 is adapted to contain tightly-packed pellets of friction-reducing agents, such as for example polyethylene oxide. When ambient water enters the nose cone 18 through bore 19 and passes through the pipe 20, it is forced by normal movement of the torpedo 10 through the water to contact the tightly-packed pellets 23 in the canister 22. If desired, the end of the pipe 20 may be provided with an appropriation screen 24 or the like to prevent pellets 23 from entering.

The end cap 14 is pierced by a plurality of holes 25 establishing communication between the interior of the canister 22 and a passage 26 defined by the adjacent ends of the cap 14 and cone 18. The passage 26 is thus continuous around the entire torpedo 10 terminating in an ejection outlet in the boundary layer region indicated generally at 27. The holes 25 each have a cross-sectional dimension that prevents the loss of pellets 23 therethrough, the number of holes being such as to impose little or virtually no obstruction to fluid flow.

As stated, in this embodiment of the invention the movement of the torpedo 10 through the water is relied upon as the active force to move the water entering the bore 19 rearward through the pipe 20 and eventually out the holes 25 and ejection outlet or passage 26. However, special means in the form of a pump 28 may be provided in the bore 19 or pipe 20 to assure such movement of the water and to permit regulation thereof by varying the pressure ratio of the inlet to outlet. At the same time, this pump 28 when included may be employed to effectively close the bore 19 when it is desired to render the system inoperative.

In the embodiment shown in FIGURE 2 the nose section 12a of the torpedo 10a is closed and one or more inlet openings 19a is provided adjacent the aft end of the main body 11a. A pipe or conduit 20a connects each inlet 19a with the interior of the canister 22a containing the pellets 23a. Interconnected in the pipe 20a is a pump 28a, the operation of which is similar to that of the pump 28 in the embodiment of FIGURE 1, however required in this case to provide a suction at each inlet opening 19a whereby fluid in the boundary layer 27a is drawn into the torpedo 10a for ultimate contact with the pellets 23a.

At its other end, the canister 22a is connected through a conduit 25a to at least one and preferably a plurality of passages 26a each terminating in an ejection outlet. The discharge of friction-reducing solution is thereby made to substantially encircle the nose section 12a near the forward end of the torpedo 10a. Screens 24a may be employed at opposite ends of the canister 22a to contain the pellets 23a therein.

While particular embodiments of the invention have been illustrated and described, it will be obvious to those skilled in the art that various changes and modifications may be made without departing from the invention. The appended claims are intended to cover all such variations as fairly fall within the true spirit and scope of this invention.

What is claimed is:

1. Means for reducing drag by the application of a friction-reducing material to the exterior surfaces of an object moving through a fluid medium comprising at least one intake opening in said object for the admission of ambient fluid, at least one outlet opening in said object adjacent the forward end thereof, a chamber adapted to contain the friction-reducing material internally of said object, said friction-reducing material being in pelletized form, interconnecting conduits between said chamber and the respective intake and outlet openings aforesaid whereby ambient fluid enters each said intake opening, contacts said friction-reducing material and is ejected from each said outlet opening, and at least one screen associated with said interconnecting conduits to prevent the passage of the pellets aforesaid therethrough.

2. The drag-reducing means of claim 1 wherein each said intake opening is located in the boundary layer region near the aft end of said object and including a pump operatively mounted in said interconnecting conduit between each intake opening and said chamber.

3. The drag-reducing means of claim 1 wherein each said intake opening is located in the boundary layer region near the aft end of said object and said intake and outlet openings substantially encircle the forward and aft ends respectively of said object.

4. The drag-reducing means of claim 1 wherein said exterior surfaces define a fluid-dynamically clean and unbroken contour facilitating movement of the object through the fluid medium, each said intake and outlet opening terminates flush with said contour, and each said outlet opening is discrete with respect to each said intake opening.

References Cited
UNITED STATES PATENTS

| | | | |
|---|---|---|---|
| 3,286,674 | 11/1966 | Thompson et al. | 114—67 |
| 2,969,759 | 1/1961 | Giles | 114—20 |
| 3,016,865 | 1/1962 | Eichenberger | 114—20 X |
| 3,196,823 | 7/1965 | Thurston | 114—20 X |
| 3,205,846 | 9/1965 | Lang | 114—20 X |

SAMUEL FEINBERG, *Primary Examiner.*

BENJAMIN A. BORCHELT, *Examiner.*

P. A. SHANLEY, G. H. GLANZMAN,
*Assistant Examiners.*